April 26, 1966  J. BOWMAN  3,248,575
SEQUENTIAL TIMER
Filed Sept. 19, 1962  2 Sheets-Sheet 2
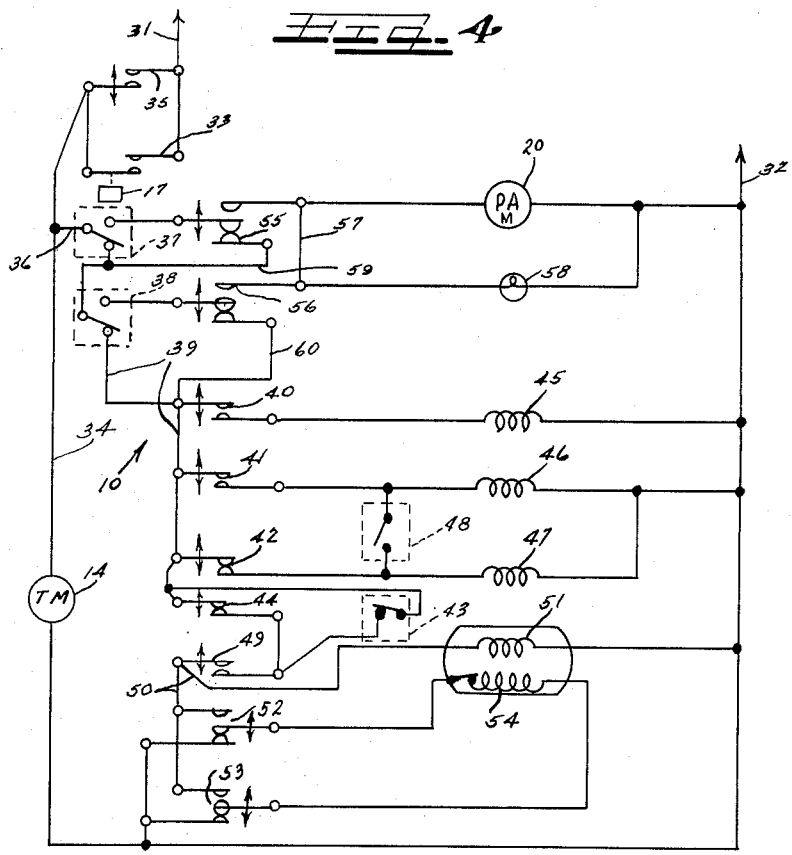

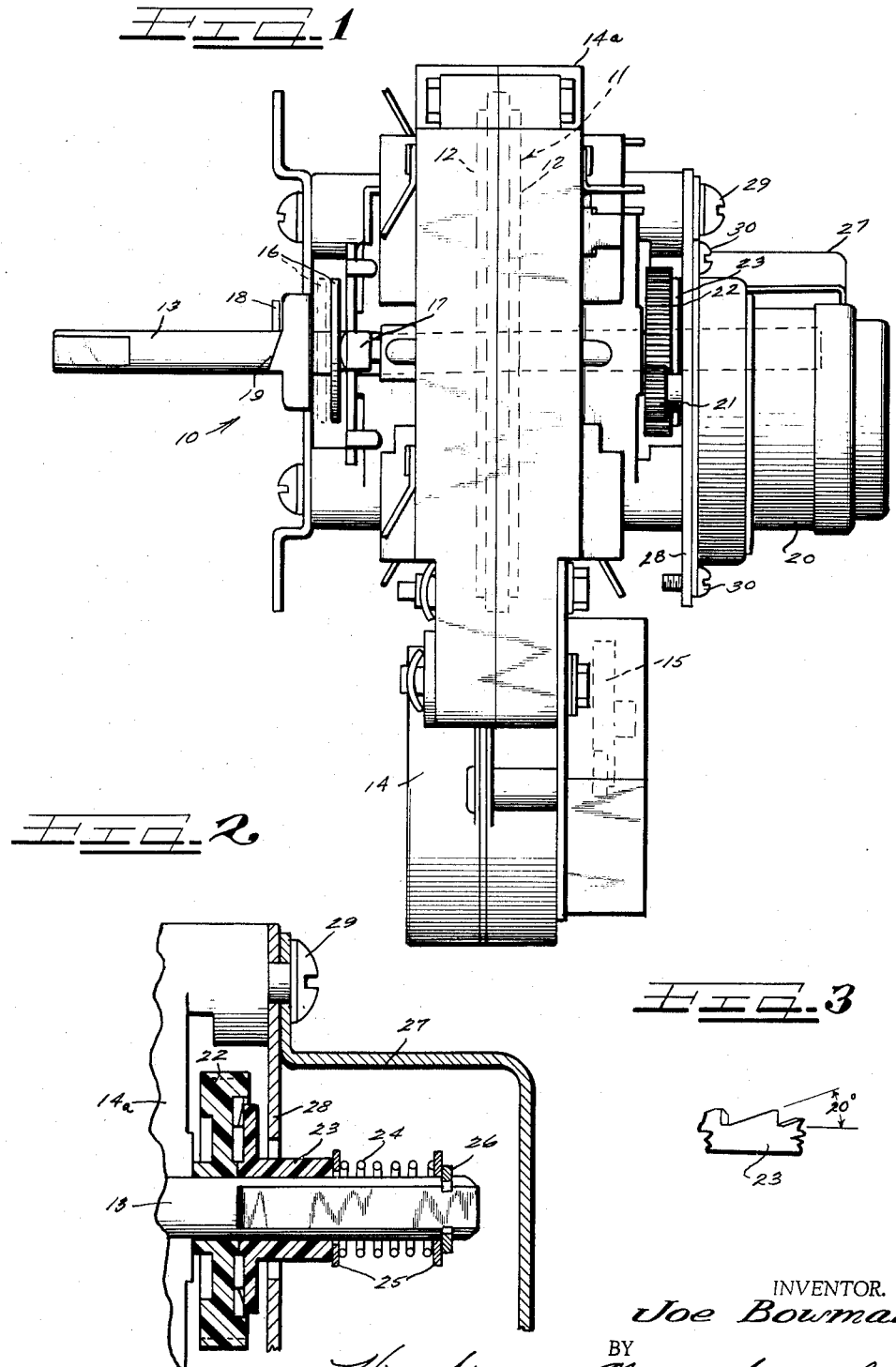

United States Patent Office 3,248,575
Patented Apr. 26, 1966

3,248,575
SEQUENTIAL TIMER
Joe Bowman, Greentown, Ind., assignor to Kingston Products Corporation, Kokomo, Ind., a corporation of Indiana
Filed Sept. 19, 1962, Ser. No. 224,696
3 Claims. (Cl. 307—141.4)

This invention relates generally to sequential timers, and more specifically to a sequential timer constructed to enable selection of one of a plurality of predetermined programs.

Although the principles of the present invention may be included in various sequential timers, a particularly useful application is made in a sequential timer of the type that is constructed to be employed to control and regulate a domestic washing machine for fabrics. In particular, when such machines are operated, they are called upon to launder various types of fabrics. As the technology of fabrics advances, it has been recognized that different laundering techniques or cycles are required. Further, the degree of soiling of the articles to be laundered may vary considerably, as may also the urgency that an operator has in completing a particular load. Therefore, it has been proposed previously to provide more than one cycle or timing program, from which the operator selects one for a particular load of articles.

Ordinarily, the various items to be controlled are under the control of electrical switches contained in the timer of such laundry machine, the timing cam having varied contours on its tracks, and having various lengths of contours to provide a desired predetermined program. Where more than one program is provided, it has been customary to devote an angular portion of the timing cam to such program, and to devote a different angular portion for each other timing program included. As the complexity of the individual programs has increased, particularly due to the addition of added laundry machine features, mechanical limitations have arisen. In particular, times of the type described employ a stepping mechanism which advances the main timing cam in increments, it being ordinarily impractical to divide the main timing cam into increments smaller than 6° each. Thus in one revolution the cam has sixty discrete angular positions for each of which the cam tracks position the controlled switches in a predetermined combination. However, as the number of programs has increased, and as the complexity of individual programs has increased, a need has arisen for more than sixty distinct positions. Yet, the use of angular increments less than 6° has remained impractical. One solution to this problem which has been proposed has been a timer which, at a given point, transfers all control to a second timer or timer portion, which up to that time has remained in a stationary or standby position, the second timer or timer portion being then in an energized condition. This transfer has occurred at the end of the timing cycle of the first timer. This transfer has also been effected during the cycle of the first timer, thereby necessitating transfer back from the second to the first timer at the end of the portion controlled by the second timer. It is evident that suitable synchronization between such timers is necessary. Ordinarily there has been but one knob for the operator to grasp, and when the operator has grasped and manually changed the setting of the one timer, this has either totally upset the synchronization between the timers, or has necessitated the provision of mechanical structure for insuring that the two timers would at all times remain synchronized.

The present invention contemplates the utilization of a single timer having a composite timing program which includes all steps and sequences that might be desired from a plurality of timing programs, such as four or five, provision being made to rapidly advance the main timing cam to create abridged timing cycles by effectively cancelling a portion or portions of the composite program to provide other cycles. This has the advantage that only a single timer is employed, thereby totally avoiding the synchronization problem described above. It has the further advantage that all program details are provided on a single timing cam, and the further advantage that all programs originate and terminate at the same timer knob or cam position.

Accordingly, it is an object of the present invention to provide an improved sequential timer switch which is normally driven by a timer motor, and which may also be driven by a second motor acting through a clutch on the timing cam of the sequential timer switch.

Another object of the invention is to provide a sequential timer having a plurality of predetermined timing programs from which the operator may select one for control.

Yet another object of the present invention is to provide a sequential timer having a plurality of programs that originate and terminate at the same timer knob or shaft position.

A still further object of the present invention is to provide a timer having a composite program, portions of which may be selectively cancelled to provide abridged other programs.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIGURE 1 is an enlarged side elevational view of a sequential timer switch provided in accordance with the principles of the present invention;

FIGURE 2 is an enlarged fragmentary cross-sectional view of a portion of FIGURE 1, with parts broken away;

FIGURE 3 illustrates a structural detail employed in the components of FIGURE 2;

FIGURE 4 is a circuit diagram of the sequential timer switch of FIGURE 1, the same being illustrated connected to components to be controlled; and FIGURE 5 is a diagram of a composite washing cycle or predetermined program, the same thus indicating the number and extent of the various tracks of the timing cam.

As shown on the drawings:

The principles of this invention are particularly useful when embodied in a sequential timer switch such as illustrated in FIGURE 1, generally indicated by the numeral 10. The sequential timer switch 10 is constructed generally as shown in the United States patent to A. R. Constantine, No. 2,703,347 and includes a main timing cam 11 having cam tracks 12 on each face thereof for operating a series of switches shown in FIGURE 4 and described below, the timing cam 11 being of the multi-track type, being corotatably supported by a shaft 13, and being disposed within a case assembly 14a. The timing cam 11 may be manually advanced to any desired position by means of a manual knob (not shown) secured to the outer end of the shaft 13. Normally the timing cam 11 is driven incrementally by a first motor 14 acting through a stepping mechanism 15, which in turn acts on the outer periphery of the timing cam 11 in a known step-by-step manner. The shaft 13 carries an actuator disk 16 which acts on a switch plunger 17. When the shaft 13 is pushed inwardly, to the right as shown in FIGURE 1, the plunger 17 is depressed by the actuator disk 16, thereby turning on the timer. The motor 14 is then energized to drive the timing cam 11 and the shaft 13 in a clockwise direction as viewed from the left of FIGURE 1. Near the end of the cycle, a radially extending pin 18 carried by the shaft 13 rides up a cam or ramp surface 19 to shift the shaft axially until the actuator disk moves to the dotted position, enabling outward movement of the plunger 17, and opening of the associated on-off switch.

One of the switches under the control of the timing cam 11 is under the further control of a selector switch shown in FIGURE 4, and controls the delivery of power to a second motor 20. The motor 20 operates through an internal gear train which terminates in an output pinion 21 which is in mesh with a gear 22 rotatably supported on the shaft 13. The gear 22 has a one-way driving connection with a sleeve member 23 which is slidably supported on the shaft 13 and which is corotatable therewith. The sleeve 23 is biased against the gear 22, such as by means of a spring 24 acting between the shaft 13 and the sleeve 23. As shown in FIGURE 2, there are provided a pair of washers 25, 25 at opposite ends of the spring 24, the spring 24 being held in a partially compressed or preloaded condition by a snap ring 26 received in a groove in the shaft 13. The corotatable connection between the sleeve 23 and the shaft 13 is provided by means of a double-D cross-section on the shaft 13, the sleeve 23 having a similar non-circular opening.

When the motor 20 is deenergized and the motor 14 is operating, the pinion 21 will be held stationary by the gear train of the motor 20 and thus will hold the gear 22 stationary. However the motor 14 will incrementally rotate the timing cam 11 and hence the shaft 13, thereby rotating the sleeve 23. The confronting faces of the gear 22 and the sleeve 23 are provided with one-way drive means in the form of teeth such as shown in FIGURE 3 which mesh with each other, the driven rotation of the sleeve 23 described causing the sleeve 23 to be cammed axially against the force of the spring 24 and to ultimately slip one tooth at a time with respect to the gear 22.

In this embodiment, both the first motor 14 and the second motor 20 are energized at one time. The speed of the motor 20 is such that it drives the shaft 13 at a steady rate which is somewhat faster than the average angular rate of movement effected by the first motor 14. When both of the motors 14 and 20 are energized, they tend to drive the timing cam in the same direction. The motor 20 actually drives the timing cam at a steady rate whenever it is energized, whereas the motor 14 drives the stepping mechanism 15. When both motors are energized, and the timing cam 11 is being driven faster by the gear 20 than the motor 14 and stepping mechanism 15 can drive it, the timing cam 11 slips in the same manner with respect to the stepping mechanism 15 that it does when the stepping mechanism 15 is being reloaded for an increment of movement. Thus the motor 20 which is normally deenergized, when it is energized, transmits energy through the gear 22 and sleeve 23, but when it is deenergized, the motor 20 effects slippage between the gear 22 and the sleeve 23. The gear 22 and sleeve 23 may thus be referred to as a one-way drive or clutch. If desired, a mechanical guard 27 may be provided to insure that any wiring in the vicinity is held away from the externally exposed moving parts. The guard 27 and a motor mounting plate 28 are secured to the timer case 14a as by a pair of screws 29, the motor 20 being secured to the mounting plate 28 by a pair of screws 30.

Referring to FIGURE 4 there is illustrated a schematic wiring diagram of the sequential timer switch of FIGURE 1, the same being illustrated in conjunction with representative components to be controlled thereby. The sequential timer switch 10 is connected across a pair of power leads 31, 32, the lead 31 extending to an on-off switch 33 which is under the control of the plunger 17 as described. When the switch 33 is manually closed, power is brought therethrough to a line 34 to which the timer motor 14 is connected, the other side of the timer motor 14 being connected to the power lead 32. At any time that the shaft 13 is manually shifted during the control program, the plunger 17 will shift, thereby opening the switch 33 to shut down the entire device. At about the same time that the shaft pin 18 approaches the ramp or cam 19, one of the cam tracks of the main timing cam closes a by-pass switch 35 and shifts all the other switches then energized to the position that they take at the end of a cycle, which is the same as that which they take at the beginning of a cycle. The switch 35 thus keeps the timing motor 14 going until the pin 18 has cleared the cam ramp 19, at which time the timing cam 11 opens the switch 35. The timer shaft position 13 is now the same as that which it was at the beginning of the cycle so that the cycle may be repeated by merely pushing in the shaft 13.

All other power for the timer and for the device controlled by the timer is conducted through a branch lead 36 connected to the lead 34 and thence through a pair of single-pole double-throw switches 37, 38 which are manually operated.

The switches 37, 38 do not form a part of the timer but are preferably disposed on the control panel of the device controlled, and either one or both of these may be actuated manually for a purpose described below. When the composite program is to be obtained, the switches 37, 38 are positioned as shown in the drawing to bring power to a line 39 leading to a detergent dispenser switch 40, a rinse water switch 41, a wash water switch 42, a normally closed external by-pass or soak switch 43, and a soak initiation switch 44.

Whenever the switch 40 is closed by the main timing cam, a detergent dispenser 45 is operated. Whenever the main timing cam 11 closes the switch 41, a solenoid valve 46 leading to a cold water supply is operated. When the switch 42 is in a closed position, a solenoid valve 47 leading to a hot water supply is energized. If slightly cooler water is desired an external manually operated temperature selector switch 48 may be closed, thereby enabling the switch 42 to operate both the cold water solenoid valve 46 and the hot water solenoid valve 47 to obtain a mixture of cold and hot water.

After the proper amount of water has been admitted by the switch 42, power passing through the soak switch 43, under the control of a motor control switch 49 is brought to a lead 50 connected to the operating winding 51 of the main appliance motor, to the upper contact of a spin direction switch 52, and to the upper contact of an agitate direction switch 53. The lower contacts of the switches 52 and 53 are each connected to the power lead 32. Under this condition, the starting winding 54 is deenergized but either the switch 52 or the switch 53 may be moved to its other position to connect selectively either end of the starting winding 54 to the power lead 50.

With the external switches 37, 38, 43 and 48 left in the position drawn, the timer will regulate various components in accordance with the entire predetermined composite program.

When the operator desires to abridge, shorten, or eliminate any predetermined portion of the composite program, the operator will place either of the switches 37 or 38 in its opposite position. By so doing, power from the branch lead 36 to the lead 39 is diverted through normally closed contacts of an auxiliary line switch 55 or through normally closed contacts of a further auxiliary line switch 56. Under this condition, the composite cycle will continue as before until one of the auxiliary line switches 55, 56 is actuated by the corresponding track of the timing cam 11. When either of these is actuated, power is removed from the lead 39 and directed to the corresponding upper contacts of the switch 55 or 56, thereby directing power to a lead 57 to which the motor 20 is connected.

A pilot light 58 is likewise connected to the lead 57, and both the motor 20 and the pilot light 58 are also connected to the power lead 32. Whenever the pilot light 58 is illuminated, it denotes that the motor 20 is in a power advancing condition, namely that the timer is then in that portion of the composite program which is being abridged or selectively omitted. It is to be emphasized that each of the switches 55 and 56 thus diverts power from other switches having inductive loads so that the loads controlled thereby are not rapidly and unnecessarily cycled. Further, since the timer motor 14 is powered by the lead 34, the timer motor 14 keeps running during the program abridgment, selective program portion omission, or skip cycling. As soon as the cam track which controls the switch 55 or 56 restores such switch to the illustrated position, the power advancing motor 20 is deenergized and power is restored, to the lead 39.

When the selector switch 37 is in the skip cycle position, during the non-omitted portion of the cycle, power is conducted from the lower contact of the switch 55 through a lead 59 to the movable element of the switch 38. Similarly, when the switch 38 is in its skip cycle position, power is conducted through the normally closed contacts of the switch 56 through a lead 60 to the lead 39.

The cam track for the switch 55 may have any angular relationship or length with respect to the cam track which controls the switch 56. Thus the predetermined portions of the composite cycle which can be omitted may be spaced from each other, adjacent to each other, or overlapping each other. In any event, both of the switches 37 and 38 may be actuated to selectively obtain a cancellation of program which is a composite of their individual cancellations. Similarly, further switch circuits of the same type may be provided in the same manner as the switches 38, 56 are provided, to enable a still greater variety of selectable programs.

If the manual switch 43 be left in an open position, the control of the windings 51, 54 will be subject to the position of the soak initiating switch 44. This switch 44 will normally open soon after the motor control switch 49 has closed, thereby typically providing on the order of only one minute of agitation. Such a cycle is useful for soaking diapers by means of a controlled soak cycle before they are placed in fresh water for the actual laundering thereof. In that manner may the shortened cycles produced by the switches 37 and 38 be further modified, namely by opening the soak switch 43. Similarly, the temperature selector switch 48 may be closed for further modifying any of the cycles.

Referring to FIGURE 5, there is shown a representative predetermined sequential program for controlling the various switches of the sequential timer 10. The diagram of FIGURE 5 is a linear representation of the concentric cam tracks provided on the opposite faces of the multi-track timing cam 11. The first column denotes various representative functions, the second column denotes the reference numeral of the switch controlling the same, and the remainder of the chart is a linear representation of the sixty angular positions to which the main timing cam 11 may be driven. Whenever the controlled laundering machine is regulated to change from spin to agitate or to change from agitate to spin, time must be given for the components involved to coast to a stop. The program therefore provides for one interval of pause wherever such change is to occur. Under ordinary operating conditions, during that period of pause, only the timer motor 14 is operated. However, in accordance with this invention, the power advance motor 20 may also be operated since it will complete the entire power advance within the period of time needed for the main timer motor 14 to step one cycle or increment. In the representative cycles shown in FIGURE 5, actuating the selector switch 37, and hence the switch 55, eliminates the steps included in the second wash, namely the steps lying between the eighteenth and the thirty-second intervals. Similarly, actuating the switch 38, and hence the switch 56, eliminates the first rinse, and hence the steps lying between the thirty-second and the forty-second intervals. Actuating both the switches 37 and 38 will thus eliminate both the second wash, a pause, and the first rinse. It is to be understood that the omitted portion of the composite cycle which is illustrated is representative, and that the principles of this invention may be applied to produce a great variety of predetermined programs.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A sequential timer switch for controlling the circuits of an electrical appliance, comprising in combination:
   (a) a single timing cam having a series of tracks jointly defining a program;
   (b) a series of switches for connection in said circuits and controlled by said series of tracks;
   (c) a first motor normally driving said timing cam to actuate said appliance circuit switches;
   (d) a one-way clutch;
   (e) a normally deenergized second motor continually connected through said one-way clutch to said timing cam, and operative when energized to drive said timing cam through said clutch at a higher rate than it is driven by said first motor; and
   (f) a selectively operable switch circuit connected to supply power to said second motor, and being under the control of a further switch operated by one of said tracks of said timing cam.

2. In a sequential timer switch having a multi-track timing cam normally driven by a first motor, and a shaft corotatably supporting said timing cam, the improvement in combination therewith comprising:
   (a) a gear rotatably supported on said shaft;
   (b) a sleeve corotatably and slidably supported on said shaft and biased against said gear;
   (c) means on said gear and said sleeve enabling relative rotation therebetween in one direction and corotation thereof in the opposite direction;
   (d) a normally deenergized second motor drivably connected to said gear and operative when energized to drive said gear in said opposite direction to effect rotation of said timing cam at a higher rate than it is driven by said first motor, and operative when deenergized to prevent rotation of said gear when said first motor drives said sleeve in said one direction; and
   (e) a selectively operable switch circuit connected to supply power to said second motor, and being under the control of one of said tracks of said timing cam.

3. In a sequential timer switch having a timing cam with multiple tracks jointly defining a single self-stopping 360° program, controlling a series of switches, and normally driven by a first motor, and a shaft corotatably supporting said timing cam, the improvement in combination therewith comprising:
   (a) a gear rotatably supported on said shaft;
   (b) a sleeve corotatably and slidably supported on said shaft and biased against said gear;
   (c) means on said gear and said sleeve enabling relative rotation therebetween in one direction and corotation thereof in the opposite direction;
   (d) a normally deenergized second motor drivably connected to said gear and operative when energized to drive said gear in said opposite direction to effect rotation of said timing cam at a higher rate than it is driven by said first motor, and operative when deenergized to prevent rotation of said gear when said first motor drives said sleeve in said one direction; and (e) a number of selectively operable switch circuits connected to supply power to said second motor and to simultaneously remove power from several of said switches while leaving the circuit to said first motor closed, and each circuit being under the control of a further one of said series of switches for effecting cancellation of a predetermined portion of said program by rapid advance of said timing cam, whereby a modified program may be selected which terminates at the same cam position as said program.

References Cited by the Examiner
UNITED STATES PATENTS

| | | | |
|---|---|---|---|
| 2,391,718 | 12/1945 | Lindemann | 307—141.4 |
| 3,011,079 | 11/1961 | Mellinger | 307—141.4 |
| 3,033,999 | 5/1962 | Thornberry et al. | 307—141.4 |
| 3,089,994 | 5/1963 | Williams | 307—141.4 |
| 3,125,105 | 3/1964 | Geiger | 307—141.4 |
| 3,151,257 | 9/1964 | Anderson | 307—141.4 |

LLOYD McCOLLUM, *Primary Examiner.*